(No Model.)

R. K. McLELLAN.
VEHICLE WHEEL.

No. 593,600. Patented Nov. 16, 1897.

Witnesses:
D. E. Eaton
C. H. Marcellus

Inventor.
Robert K. McLellan
by
Howard L. Osgood
Attorney.

UNITED STATES PATENT OFFICE.

ROBERT K. McLELLAN, OF ROCHESTER, NEW YORK.

VEHICLE-WHEEL.

SPECIFICATION forming part of Letters Patent No. 593,600, dated November 16, 1897.

Application filed January 8, 1895. Serial No. 534,273. (No model.)

*To all whom it may concern:*

Be it known that I, ROBERT K. MCLELLAN, a citizen of the United States, and a resident of the city of Rochester, in the county of Monroe and State of New York, have invented certain new and useful Improvements in Vehicle-Wheels, of which the following is a specification, reference being had to the drawings accompanying and forming part of this specification.

My invention relates to certain new and useful improvements applicable to velocipedes, cycles, sulkies, and other like vehicles, and has for its objects to provide an improved construction of wheel-hub which will secure a more complete exclusion of dust from the bearings of the wheels and the crank-shaft and to furnish an ever-ready means for adjusting these bearings to take up wear or for other purposes.

With these objects in view the invention consists in the construction, combination, and arrangement of parts hereinafter described and claimed, and illustrated in the accompanying drawings, wherein—

Figure 1:
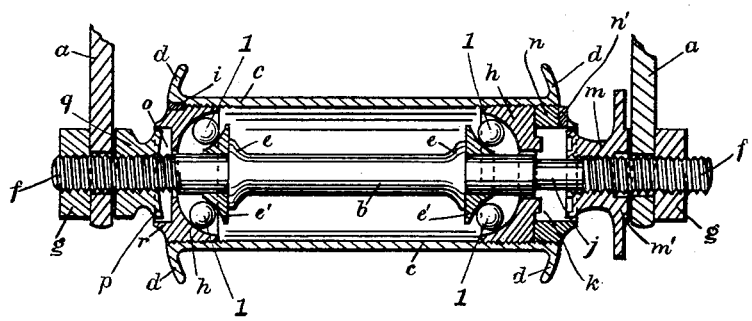
Figure 2:
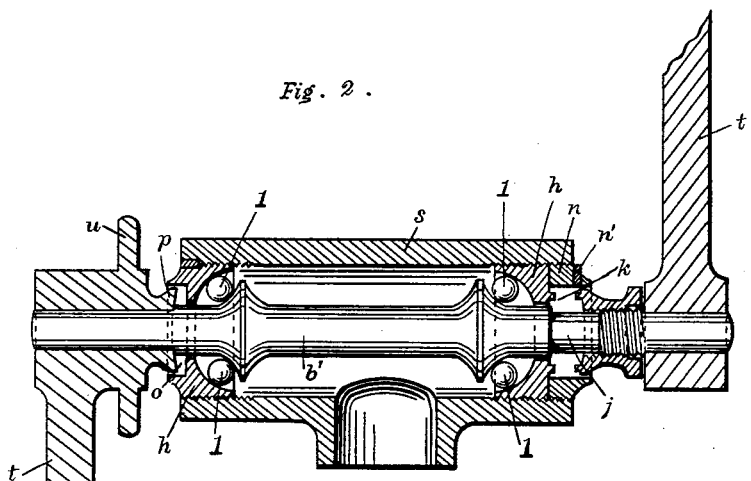
Figure 3:
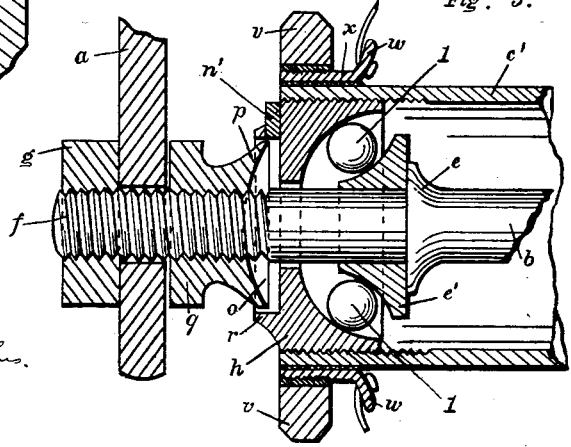

Figure 1 is a longitudinal section taken centrally through the front-wheel hub of a bicycle. Fig. 2 is a similar section through the bearing-sleeve of the crank or pedal drive-shaft, and Fig. 3 is a similar sectional view of one end of the hub of the rear or driving wheel.

Referring more especially to Fig. 1, $a\ a$ denote the vertical forks of the machine, $b$ the stationary axle, and $c$ the revoluble hub of the wheel. This hub is formed out of a section or short length of seamless metallic tubing and is provided at its extreme ends with integral spoke-securing flanges $d\ d$, which are formed by bending or rolling the edges of the tubing outwardly and backwardly, as illustrated in the drawings. By thus forming the spoke-flanges I produce ease and economy of construction combined with great strength and lightness, and I also bring the ball-races close to the ends of the hub, thus giving the greatest security for the hub and the greatest resistance against springing or other displacement. The axle consists of a solid forging formed with outwardly-facing square-faced shoulders $e\ e$, and has its outer ends which project beyond the ends of the hub provided with screw-threads $f\ f$. These threaded portions of the axle take into corresponding openings in the forks $a\ a$, and the axle is securely held therein against movement by means of jam-nuts $g\ g$, screwed on the ends outside the forks. The shoulders $e\ e$ form seats for conical annular collars $e'\ e'$, made of hard tool-steel and fitting tightly upon the axle. The collars are preferably slightly concaved on the outer surfaces and abut against the square faces of the shoulders, thus constituting treads or raceways for antifriction-balls $l\ l$, which treads are removable as occasion requires.

The ends of the tubular hub are closed by combined bearing and dust caps $h\ h$, which are concaved on their inner sides, so as to form with the oppositely-concaved surfaces of the annular collars $e'\ e'$ the completed raceways for the balls. These caps are provided with central openings, through which the axle ends project, and are secured in the ends of the hub by means of screw-threads on their exterior surface taking into corresponding threads on the interior of the hub ends. Some provision for adjustment of these caps is necessary to take up wear and to afford access into the interior of the hub, but as these objects can be effectuated by having only one of the caps adjustable I prefer to lock the other immovably in place, an ordinary key $i$ being shown applied to the left-hand cap in Fig. 1 for this purpose. I have herein shown the right-hand cap as the adjustable one, and I accomplish the adjustment and locking of this cap in different positions by the following instrumentalities: The portion of the axle projecting beyond the hub end is, as already described, screw-threaded, but between this threaded portion and the cap the axle is plain and unthreaded and preferably reduced in diameter, as indicated at $j$, Figs. 1 and 2. The outer face of the cap is provided with projections or depressions $k$, by means of which an adjusting device may be engaged therewith and the cap screwed in or out. In the present preferred embodiment of the invention such adjusting device consists of a nut $m$, having a flanged head $m'$ for the engagement of a wrench or spanner and projections or depressions on its inner end for interlocking with those on the cap. This nut is carried on the axle inside the vertical fork and is adapted to the thread on this part of the axle. Normally it is in engagement with the thread and occupies the space between the end of the hub and the fork. The plain or unthreaded portion of the axle before adverted to is of sufficient length to permit the nut to leave the some entirely before interlocking with the cap, so that it is free to move with said cap in either direction.

After the cap has been adjusted to take up wear or for any other purpose it is desirable to lock it securely in such position, and although other means may be employed I prefer to use the jam-ring $n$, which is screwed into the end of the hub tightly against the cap. This ring may be conveniently operated by an ordinary spanner, a lug $n'$ being provided for engaging the spanner in a well-known way.

In order to secure a more complete exclusion of dust and dirt from the bearings, I have devised a novel arrangement of parts constituting a dust-guard, as follows: In the outer face of the fixed bearing-cap and surrounding the central axle-opening therein an annular recess $o$ is formed. Into the open end of this recess fits an outwardly-projecting annular flange $p$ on the inner end of a nut $q$, which is adjustable on the threaded portion of the axle between the vertical fork and the cap $h$. Around the edge of the recess $o$ on the outer face of the cap is an annular lip or rim flange $r$, which overlaps the flange $p$ on the nut $q$. The outer surface of this flange is inclined or made sloping, as shown most clearly in Fig. 3, so that any dust and dirt falling on the same will be caused to slide off upon the flange of the nut past the joint between the same and the mouth of the recess. The nut-flange $p$ is also inclined, as shown in Fig. 3, so that any dust and dirt falling thereon are caused to slide off away from the opening to the recess in the cap, and the inclination of the flange on the nut forms practically a continuation of that of the lip around the recess. It results from this construction that the danger of dust and dirt finding their way into the bearings is reduced to a minimum, first, by reason of the overlapping of the flanges $p$ and $r$ at the mouth of the opening; second, by the inclination of the outer surfaces of these flanges, which causes the dust and dirt to slide off past the entrance to the recess and prevents accumulations, and, third, by reason of the circuitous path the dust would have to travel before it could reach the bearings.

Upon reference to Fig. 3, where, owing to the enlarged scale, the feature is best illustrated, it will be noted that the inner face of the annular flange $p$ on the nut is hollowed out or concaved. The axle fits the central opening in the cap $h$ so snugly that the oil from the bearing will always keep the space between them closed. Some oil, of course, will work out into the recess $o$, and this will keep the sides of the recess and the concaved end of the nut well oiled, so that the dust will be caught thereby and detained in the said space, but only such dust enters these recesses as is suspended in the air, and this is really negligible in amount. The very circuitous passage which dust or dirt would have to take to get from the outer end of the bearing to the ball-races prevents the entry of the dust, and the overlapping flange $r$ sheds all the dirt therefrom into the deep groove around the flange $p$, from which the dust cannot work into the interior of the bearing.

As the adjustable cap at the other end of the hub does not in the construction herein shown project beyond the edge of the hub or even lie flush with it, and especially as the interposition of the jam-ring between it and the adjusting-nut $m$ leaves sufficient space to catch the fine particles of dust, it is unnecessary to form any recess in the outer face of the cap corresponding to that in the opposite cap; but in order to preserve the same arrangement of dust-guard lips and flanges as at the other end I provide the jam-ring with a sloping or inclined lip around the opening in all respects like that on the other cap, and I also form the inner end of the adjusting-nut with an inclined flange similar to that on the nut $g$. These parts have the same location and relative arrangement as their counterparts at the other end of the hub. At this end it is not essential (though of course it may be done) to concave the inner end of the nut, for the space between it and the cap is sufficient for the purpose.

Although I have thus far described the invention with reference to the front wheel only, it will be obvious that it is equally applicable to the rear wheel and also to the crank-shaft. It is desirable to bring the pedals as near together as possible, and as it is also important to retain at this point the means for adjusting the bearings I dispense with the separate adjustable nut at the left end of the shaft, as in the wheel construction, and with a view to reducing the distance between the cranks form the inclined flange $p$ on a short inward extension of the hub of the crank, as clearly seen in Fig. 2. This extension is constructed in all respects like the nut $q$ and, except that it lacks the adjustable feature, is in operation and effect the same as the nut.

In Fig. 2, $s$ denotes the sleeve forming the bearing for the pedal-crank shaft. The cranks are designated by $t\ t$, and $u$ indicates the sprocket-driver over which the chain which runs to the rear wheel is thrown. It will be noted that in this figure the treads or raceways for the balls are integral with the shaft, being formed in the process of drop-forging in a manner now well understood. The construction shown in Figs. 1 and 3 may, however, be used at this point, if desired.

As before explained, the hub $c'$ of the rear wheel is, like that of the front wheel, composed of a section of seamless metallic tubing, with a spoke-receiving flange turned up at the end. In the front-wheel construction both flanges are formed in this manner, but the sprocket-wheel, which of course must be outside the spokes, interferes with such arrangement on the rear wheel, and, besides, it is advisable to reinforce the hub of this wheel at the end where the driving-sprocket is located. For this purpose I braze or otherwise rigidly secure upon the outside of the hub at this end a narrow ring or band $x$, the inner edge of which is turned or bent outwardly and backwardly, forming the spoke-receiving flange $w$. Upon this band, preferably by screwing it on, I mount and secure the driver $v$, around which the chain from the sprocket $u$ runs and by which the machine is propelled.

Such being in detail the construction of my invention, the operation will be sufficiently understood from the foregoing description without further explanation.

The principal advantages in the construction of hub hereinbefore described are that the adjustment of the same may be effected without loosening the nuts which secure the axle in the forks and without slackening the chain, also that the wheel may be entirely removed from the forks without in any way disturbing the adjustment of the bearings.

A further advantage of the above hub construction is that it permits the easy cleaning of the interior of the same, there being no internal projections or depressions to catch the oil and dirt, and is easy to take apart, and the outside of the hub $c$ is also easily cleaned, as it is smooth and straight.

Having thus described my invention, what I claim is—

1. A bearing for cycles and the like, comprising a tubular hub or sleeve, an axle, a cap secured to the end of the hub or sleeve; and through which the end of the axle projects, an annular recess in the outer face of the cap around the axle-opening, and an annular flange carried upon the axle and fitting into and closing the recess, said flange being inclined on its outer side so as to direct the dust away from the recess, and being concaved on the side toward the recess; substantially as described.

2. In a bicycle or other like vehicle, the frame; a tubular hub or sleeve having an interiorly-threaded end; an axle having a collar or flange within said hub, and having a threaded projecting end, and adjacent to it, an unthreaded portion of less diameter than said threaded end; a cap screwed into the threaded end of the hub or sleeve and coöperating with the collar or flange on the axle to form a bearing or race for antifriction-balls; and a nut normally screwed upon the threaded end of the axle to secure the frame to the axle, and adapted when unscrewed from the said threaded end to turn upon said unthreaded portion and to interlock with the end cap whereby said cap may be adjusted; substantially as described.

3. A bearing for the wheels of cycles and the like, comprising a hub, an axle, a cap secured to the end of the hub and through which the axle projects, an annular recess in the outer face of the cap around the axle-opening, an adjustable nut on the axle having an inclined flange fitting into and closing the recess, and a rim around the recess overlapping the flange on the nut, whereby the dust is directed upon the inclined portion of the flange of the nut; substantially as described.

4. A bearing for the wheels of cycles and the like, comprising a hub, an axle, a cap secured to the end of the hub and through which the axle projects, an annular recess in the outer face of the cap around the axle-opening, an adjustable nut on the axle having a flange fitting into and closing the recess, and a flange attached to the hub and extending around and overlapping the flange on the nut, whereby the dust is directed outside the flange of the nut; substantially as described.

ROBERT K. McLELLAN.

Witnesses:
H. L. OSGOOD,
E. H. MARSELLUS.